(12) United States Patent
Sartorius

(10) Patent No.: US 11,649,037 B2
(45) Date of Patent: May 16, 2023

(54) LOW LATENCY PITCH ADJUSTABLE ROTORS

(71) Applicant: The Boeing Company, Chicago, IL (US)

(72) Inventor: Thomas Skyler Sartorius, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 216 days.

(21) Appl. No.: 16/820,231

(22) Filed: Mar. 16, 2020

(65) Prior Publication Data

US 2020/0331585 A1 Oct. 22, 2020

Related U.S. Application Data

(60) Provisional application No. 62/818,832, filed on Mar. 15, 2019.

(51) Int. Cl.
*B64C 11/30* (2006.01)
*B64C 11/32* (2006.01)
*B64C 11/44* (2006.01)
*B64C 11/06* (2006.01)

(52) U.S. Cl.
CPC ............ *B64C 11/303* (2013.01); *B64C 11/06* (2013.01); *B64C 11/301* (2013.01); *B64C 11/32* (2013.01); *B64C 11/44* (2013.01)

(58) Field of Classification Search
CPC ......... B64C 11/06; B64C 11/30; B64C 11/32; B64C 11/34; B64C 11/353; B64C 11/346; B64C 11/36; B64C 11/38; B64C 11/40; B64C 11/42; B64C 11/44; B64C 11/303; B64C 11/301; B64C 2201/108; B64C 2201/165; B64C 2201/162; B64C 15/12; B64C 29/0033
See application file for complete search history.

(56) References Cited

U.S. PATENT DOCUMENTS 2,815,082 A * 12/1957 Kessler ................. B64C 11/303
91/52
2015/0377216 A1* 12/2015 Deshpande ............. F03D 7/045
416/1
2020/0140073 A1* 5/2020 LeGrand ................. B64C 11/30

FOREIGN PATENT DOCUMENTS

WO WO-2018037795 A1 * 3/2018 ............. B64C 11/06

* cited by examiner

*Primary Examiner* — Richard A Edgar
(74) *Attorney, Agent, or Firm* — Hanley, Flight & Zimmerman

(57) ABSTRACT

Low latency pitch adjustable rotors are disclosed. A disclosed example rotor includes a rotor hub to rotate about a rotational axis, rotor blades coupled to the rotor hub, the rotor blades being pitch adjustable and having corresponding pitch angles, and a reaction hinge operatively coupled between the rotor hub and the rotor blades, the reaction hinge to move relative to the rotor hub in response to an angular acceleration or deceleration of the rotor hub to adjust the pitch angles.

20 Claims, 11 Drawing Sheets

LOW LATENCY PITCH ADJUSTABLE ROTORS

RELATED APPLICATION

This patent claims priority to, and the benefit of, U.S. Provisional Patent Application Ser. No. 62/818,832, which was filed on Mar. 15, 2019. U.S. Provisional Patent Application Ser. No. 62/818,832 is hereby incorporated herein by reference in its entirety.

FIELD OF THE DISCLOSURE

This disclosure relates generally to aircraft and, more particularly, to low latency pitch adjustable propellers.

BACKGROUND

Aircraft, such as rotorcraft or fixed wing aircraft, usually employ rotors (e.g., propellers) to generate lift and/or thrust. For example, a multi-rotor aircraft such as a quadcopter or unmanned aerial vehicle (UAV) can generate thrust by varying rotational speeds (e.g., rotations per minute (rpm)) of multiple fixed-pitch rotors.

SUMMARY

An example rotor includes a rotor hub to rotate about a rotational axis, rotor blades coupled to the rotor hub, the rotor blades being pitch adjustable and having corresponding pitch angles, and a reaction hinge operatively coupled between the rotor hub and the rotor blades, the reaction hinge to move relative to the rotor hub in response to an angular acceleration or deceleration of the rotor hub to adjust the pitch angles.

An example method of operating a rotor includes changing an amount of torque applied to a rotor hub operatively coupled to rotor blades, the rotor hub to spin about a rotational axis, a reaction hinge operatively coupled between the rotor blades and the rotor hub, and in response to an angular deceleration or acceleration of the rotor hub from the change in the amount of torque, moving the reaction hinge relative to the rotor hub to adjust pitch angles of the rotor blades.

An example non-transitory machine readable medium includes instructions, which when executed, cause a processor to at least calculate a desired adjustment of a pitch angle of at least one rotor blade based on an angular acceleration or deceleration of a rotor hub operatively coupled to the at least one rotor blade, and cause movement of a reaction hinge relative to the rotor hub, the reaction hinge operatively coupled between the at least one rotor blade and the rotor hub based on the desired adjustment.

Figure 1A:
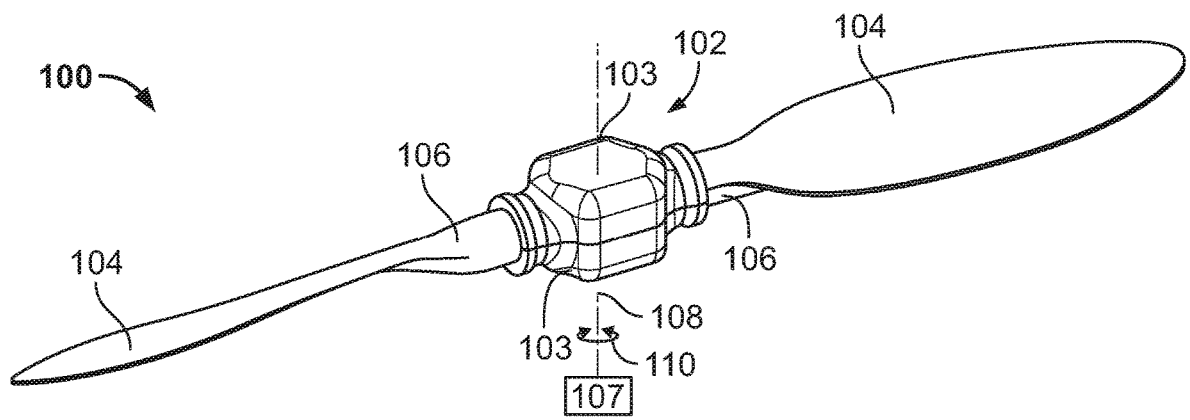
FIGS. 1A and 1B illustrate an example rotor in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Low latency pitch adjustable rotors are disclosed. Some known pitch adjustable rotors employ actuators and/or linkages that move the rotor blades of the rotors to a desired pitch angle to vary a lift and/or thrust generated. These known implementations can typically involve significant power consumption, numerous components and, thus, additional complexity, weight and cost.

Examples disclosed herein provide energy efficient pitch adjustable rotors (e.g., variable pitch rotors, rotatable rotors, etc.) with a relatively low latency. Particularly, in response to a change in torque provided thereto and/or angular acceleration of the system, examples disclosed herein can adjust a pitch angle of rotor blades of the rotors in a relatively short time to generate preferred movement(s) of the rotor blades to adjust thrust characteristics. Accordingly, in addition to relatively quick adjustment of the rotor blades, examples disclosed herein can exhibit favorable flight and/or movement dynamics.

Examples disclosed herein include a rotor (e.g., a propeller) with a corresponding rotor hub that rotates about an axis. In turn, rotor blades (e.g., propeller blades, airfoils, etc.), which are pitch adjustable (e.g., rotatable about their respective pitch axes), are coupled to the rotor hub. According to examples disclosed herein, the aforementioned rotor hub includes and/or is coupled (e.g., operatively coupled) to a reaction hinge (e.g., an acceleration-based pitch adjuster) that adjusts the pitch angles of the rotor blades in response to an angular acceleration or deceleration of the rotor hub (e.g., due to a change in torque applied to the rotor hub). In other words, the reaction hinge responds to an acceleration of the rotor hub and moves relative to the rotor hub and, thus, adjusting a pitch angle change of the rotors.

As used herein, the terms "rotor" and "rotor assembly" refer to a device, component and/or an assembly that supports at least one rotor blade, airfoil and/or propeller. As used herein, the term "pitch adjustable rotor" refers to a rotor for which a pitch of a rotor blade can be varied. As used herein, the term "displaceable mass" refers to a mass that is movable (e.g., linearly and/or translatably movable) to vary a moment of inertia (e.g., an instantaneous moment of inertia) of rotors and/or a rotor assembly. As used herein, the term "reaction hinge" refers to a device, component and/or assembly that causes movement of one component relative to another component in response to an acceleration (e.g., angular acceleration). The relative movement can be rotational and/or translational.

Figure 1B:
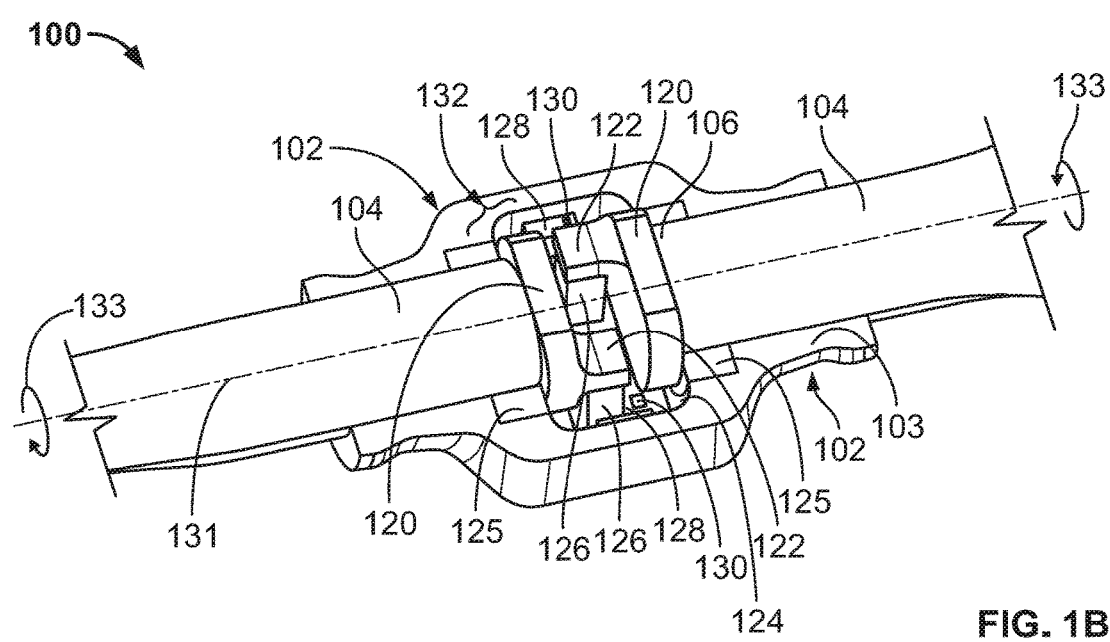

FIGS. 1A and 1B illustrate an example rotor (e.g., a rotor assembly, a propeller assembly, etc.) 100 in accordance with teachings of this disclosure. Turning to FIG. 1A, the rotor 100 of the illustrated example is implemented to adjust rotor blade pitch angles in response to an angular acceleration (e.g., a change in rotational torque). The rotor 100 includes a rotor hub (e.g., a rotor junction) 102 with corresponding covers (e.g., panels, housing portions, etc.) 103, pitch adjustable rotor blades (e.g., propeller blades, airfoils, etc.) 104 and rotor interfaces (e.g., rotor root sections) 106. In this example, the rotor 100 is implemented for a multi-rotor unmanned aerial vehicle (UAV). However, examples disclosed herein can be implemented for any appropriate rotor and/or propeller application, such as manned aircraft, watercraft, turbine blades, ground-based vehicles, etc. While two of the rotor blades 104 are shown in this example, any appropriate number (e.g., three, four, five six, etc.) of the rotor blades 104 can be mounted and/or coupled to the rotor hub 102 instead.

In operation, the example rotor hub 102 is rotated via a transmission that is operatively coupled to a motor or engine 107. In particular, the engine 107 causes rotation of the rotor hub 102 about an axis 108, as generally indicated by a double arrow 110. In turn, the rotor blades 104 rotate along with the rotor hub 102, thereby generating lift in this example. When a torque applied to the rotor hub 102 from the motor or engine 107 is relatively constant, the rotor blades 104 generally remain at steady state and/or nominal pitch angles.

FIG. 1B is a partial cutaway view of the example rotor 100 of FIG. 1A. As can be seen in the illustrated view of example FIG. 1B, the aforementioned rotor hub 102 is shown with one of the covers 103 removed for clarity. In this example, each of the rotor interfaces 106 of the respective rotor blades 104 are shown including a base 120 with a protrusion or tab 122 extending therefrom. Further, the example cover 103 includes a cavity 124 to receive the base 120 and the protrusion 122. The example rotor hub 102 also includes bearings 125, and actuators (e.g., piezo-electric actuators, linear actuators, rotational actuators, solenoids, etc.) 126, each of which are controlled by respective controllers 128 (PCB). The actuators 126 of the illustrated example are operatively coupled to respective ones of the protrusions 122 of the rotor blades 104. In some examples, the controllers 128 include sensors 130.

To reduce a latency of a pitch angle adjustment of the rotor blades 104 in response to a change and/or variation in applied torque to the rotor hub 102, the controllers 128 direct the respective actuators 126 to move the protrusions 122 of the rotor blades 104. In turn, the movement of the protrusions 122 rotates the rotor blades 104 about a pitch axis 131 defined by the bearings 125, thereby varying pitch angles of the rotor blades 104, as generally indicated by arrows 133. In this example, a detected acceleration (e.g., by the sensors 130) causes the actuators 126 to move the rotor blades 104 and, as a result, the pitch angles are adjusted in a relatively short amount of time. In some examples, the pitch angles are adjusted to desired pitch angles that correspond to associated non-acceleration steady state pitch angles (e.g., faster than would usually take to reach the steady state rotation at a given torque). Additionally or alternatively, the pitch angles can be adjusted to counteract and/or mitigate non-preferred motion of the rotor blades 104, such as fluttering, for example. Accordingly, the actuators 126 and the protrusions 122 act as a reaction hinge 132, for example.

In some examples, the controllers 128 direct movement of the actuators 126 based on sensor data from the sensors 130. In some such examples, the sensors 130 measure pitch angles, an acceleration and/or a change in pitch angles (e.g., pitch angle differential(s), etc.) of the rotor blades 104 and, in turn, the controllers 128 direct movement of the actuators 126 to rotate the rotor blades 104 about the bearings 125 into desired pitch angles with a relatively low latency. In some examples, the controllers 128 can determine a difference between current measured pitch angles of the rotor blades 104 and desired pitch angles of the rotor blades 104 and, accordingly, direct movement of the actuators 126 based on the difference to orient the rotor blades 104 to the desired pitch angles.

While the example rotor assembly 100 utilizes an actuated and/or controlled movement device, as can be seen in connection below with FIGS. 2A-5C, examples disclosed herein can also be implemented without actuation and/or sensor-based control schemes. In other words, examples disclosed herein can be implemented with mechanical components and/or devices that quickly orient the rotor blades 104 to desired pitch angles (e.g., steady state pitch angles) in response to an angular acceleration without use of an actuator and/or movement device.

Figure 2A:
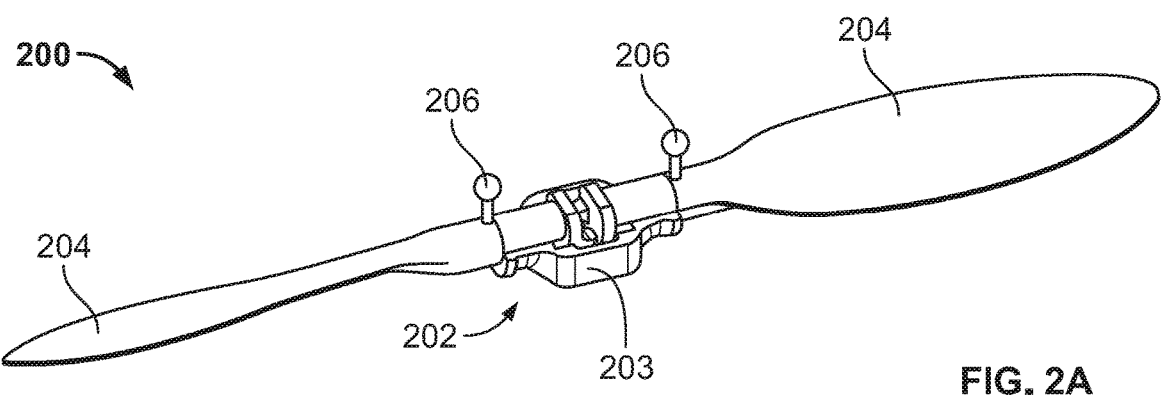
FIGS. 2A-2C illustrate an alternative example rotor in accordance with teachings of this disclosure.
Figure 2B:
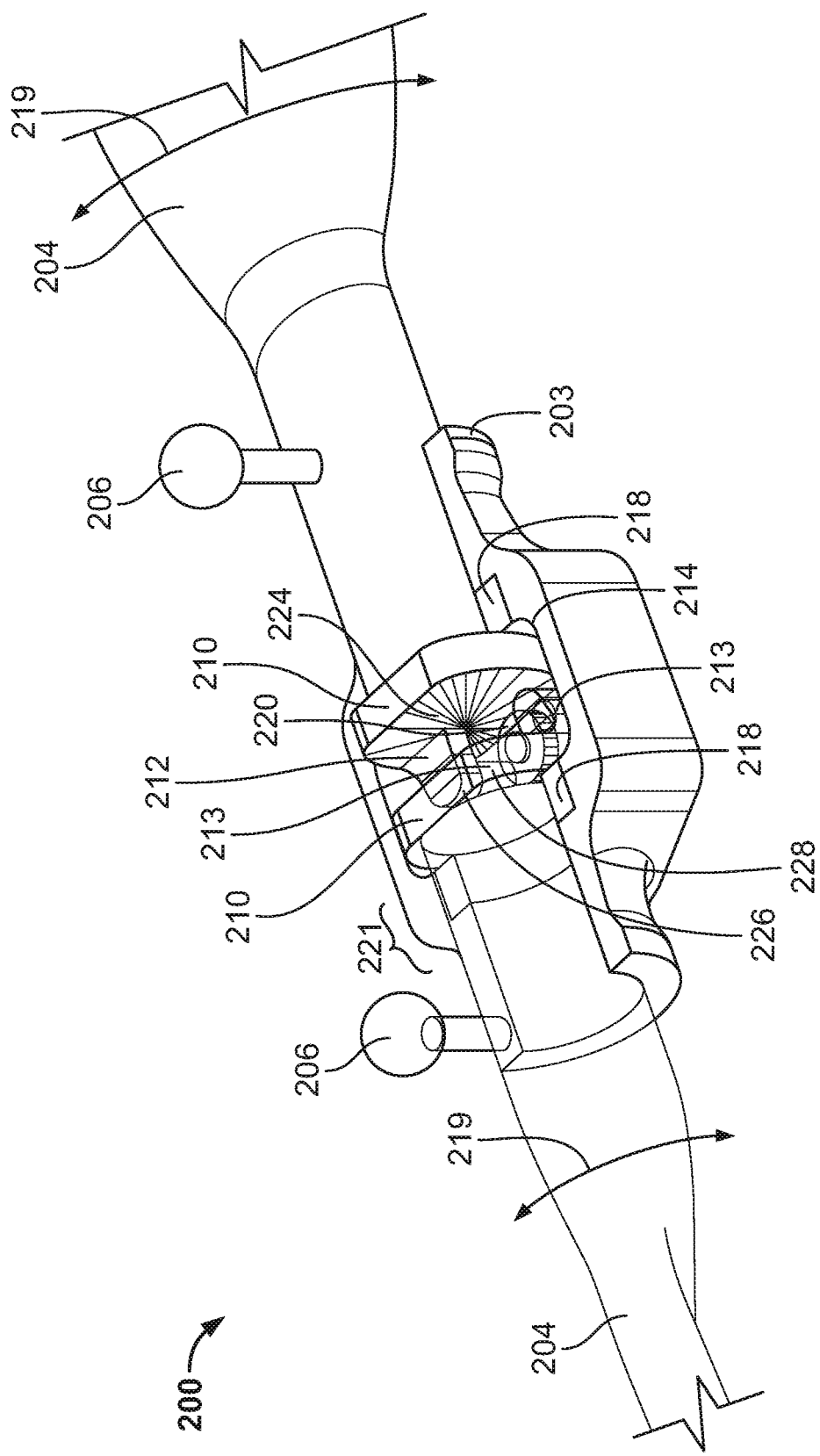
Figure 2C:
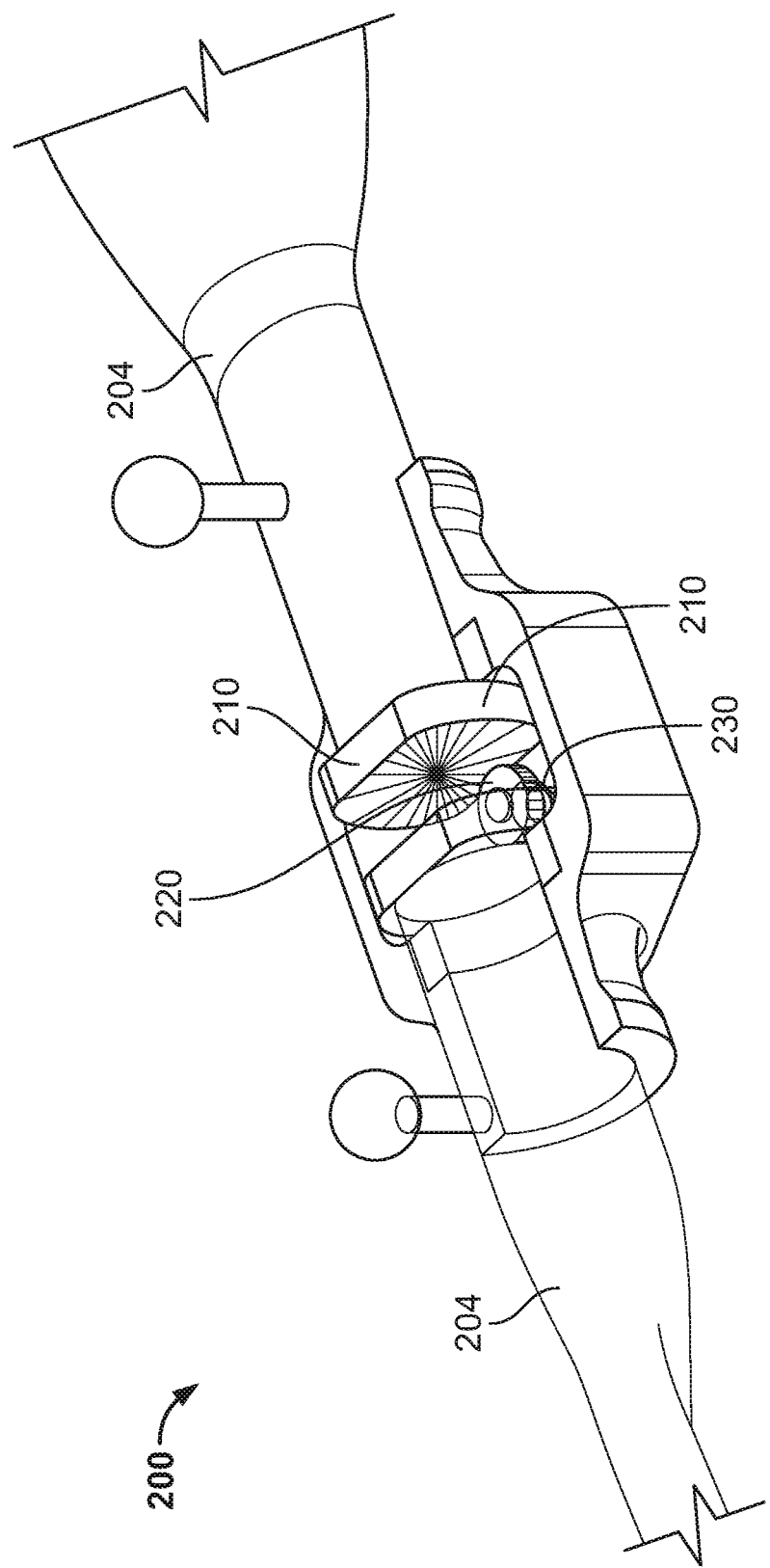

FIGS. 2A-2C illustrate an alternative example rotor 200 in accordance with teachings of this disclosure. Turning to FIG. 2A, the rotor 200 includes a rotor hub 202 with corresponding covers 203, one of which is removed for clarity, and pitch adjustable rotor blades 204. In the illustrated example, masses (e.g., mass representations, center of mass positions, reaction masses. etc.) 206 corresponding to the rotor blades 204 and/or the rotor 200 are shown. In this example, the masses 206, which are depicted as spheres in FIG. 2A, indicate aggregate mass center positions of the rotor blades 204.

Turning to FIG. 2B, a partial cutaway view of the rotor 200 is shown with one of the covers 203 removed for clarity. In the illustrated example of FIG. 2B, the rotor blades 204 include respective bases 210 and protrusions 212, which are operatively coupled to springs 213. In this example, the rotor blades 204 are shown partially disposed in a cavity 214 of the cover 203 while bearings 218 are operatively coupled to the respective rotor blades 204. Further, in some example, the rotors blades 204 are operatively coupled to a synchronizer (e.g., a gear synchronizer, a bevel gear, a pinion gear, a linkage, etc.) 220.

In operation, an overall mass distribution (e.g., an inertial representation based on geometries of masses and/or use of attached masses), which is represented by the masses 206, causes the rotor blades 204 to rotate about the bearings 218, as generally indicated by arrows 219, when the rotor hub 202 experiences an angular acceleration. In other words, the rotor blades 204 are feathered when the angular acceleration is applied to the rotor hub 202. Accordingly, the rotor blades 204 return to their respective steady state pitch angles once angular acceleration of the rotor hub 202 is ceased and/or discontinued. In this example, the masses 206, the tabs 212 and the springs 213 act as a reaction hinge 221.

In some examples, the aforementioned masses 206 and/or mass distributions resulting from the masses 206 can act as counterweights to reduce an applied control force for moving or holding the pitch angles of the rotor blades 204 at a given position and/or orientation. Accordingly, aggregate weight can be sized appropriately based on application and/or design needs. For example, if the weights are oversized as counterweights, the rotor blades 204 can be driven to a maximum pitch angle position (e.g., maximum positive pitch angle, maximum negative pitch angle, etc.) depending on clocking relative to respective mass centers of the rotor blades 204. Accordingly, the weights can be appropriately sized to function as counterweights for a desirable pitch moment of the rotor blades 204 based on specific applications and/or design needs.

In the illustrated example, pitch angles of the rotor blades 204 are synchronized via the aforementioned synchronizer 220. In particular, the example synchronizer 220 is implemented as a gear and/or gear train to maintain the rotor blades 204 at similar (e.g., equivalent) pitch angles. Particularly, gears (e.g., gear teeth) 224 of the bases 210 contact and engage a gear 226 of the synchronizer 220. However, any other appropriate type of synchronization mechanism and/or methodology can be implemented instead. For example, linkages and/or a linkage system can be implemented instead of gearing. In some other examples, a clutch is implemented to vary a degree of relative displacement and/or rotation between the rotor blades 204.

To move and/or orient the rotor blades 204 into their nominal/steady state acceleration pitch angles, which are associated with a relatively constant amount of torque applied to the rotor hub 202, springs 228 can be implemented, for example. Particularly, the springs 228 are operatively coupled to the respective protrusions 212 of the rotor blades 204.

FIG. 2C depicts the example rotor 200 of FIGS. 2A and 2B, but with a torsional spring 230 operatively coupled to the synchronizer 220 instead of the springs 228 shown in FIG. 2B. In contrast to the example of FIG. 2B, the protrusions 212 are not implemented and, instead, the torsional spring 230 moves and/or orients the rotor blades 204 into their nominal/steady state acceleration pitch angles via the synchronizer 220.

Figure 3A:
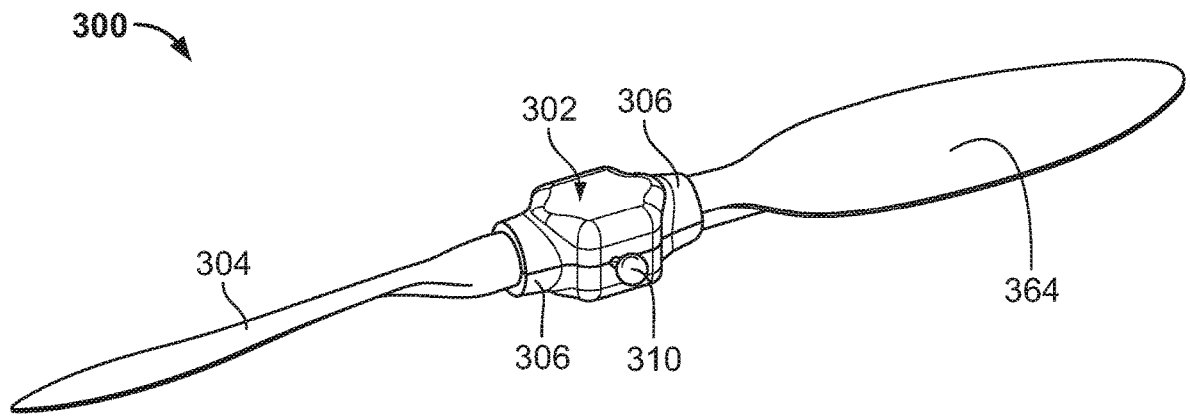
FIGS. 3A-3D illustrate another alternative example rotor in accordance with teachings of this disclosure.

FIGS. 3A-3D illustrate another alternative example rotor 300 in accordance with teachings of this disclosure. Turning to FIG. 3A, the rotor 300 includes a rotor hub 302 and rotor blades 304. The example rotor blades 304 are operatively coupled to the rotor hub 302, which includes covers 306. The rotor 300 of the illustrated example also includes masses (e.g., reaction masses) 310, which extend outwardly away from the rotor hub 302. However, the masses 310 can, instead, be positioned within the rotor hub 302.

Figure 3B:
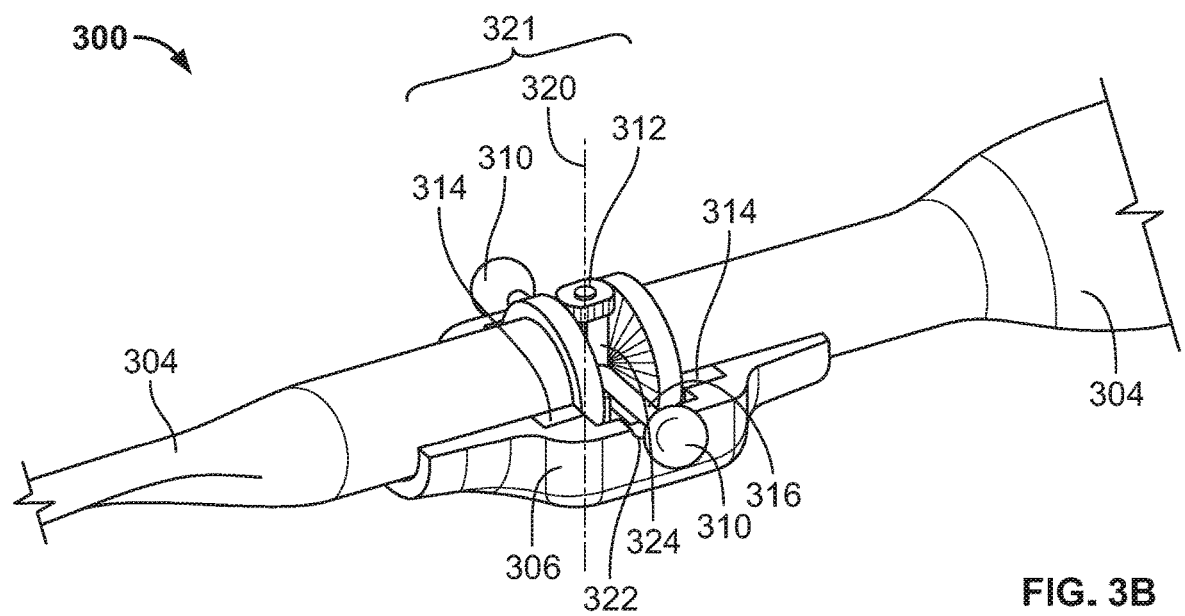

FIG. 3B is a detailed partial cutaway view of the rotor 300. In this example, one of the aforementioned covers 306 is removed for clarity. As can be seen in FIG. 3B, a synchronizer (e.g., a gear teeth synchronizer, a bevel gear, a pinion gear) 312 is shown positioned between the rotor blades 304 and bearings 314 support respective ones of the rotor blades 304. In this example, the aforementioned masses 310 extend away from the synchronizer 312 via respective stems 316. Further, the masses 310 are positioned at least partially external to the rotor hub 302 and away from a rotational axis 320 of the synchronizer 312. In this example, the rotor hub 302 includes at least one opening 322 so that the masses 310 can be positioned external to the rotor hub 302. In some examples, a spring (e.g., a torsional spring) 324 is operatively coupled to the synchronizer 312. In this example, the masses 310, the stems 316 and the synchronizer 312 define a reaction hinge 321.

To vary pitch angles of the rotor blades 304 upon angular acceleration or deceleration of the rotor hub 302, the masses 310 displace relative to other components of the rotor 300 and, in turn, cause rotational movement of the synchronizer 312 about the axis 320. In some examples, the spring 324 facilitates centering the synchronizer 312 and, thus, the rotor blades 304 to their nominal pitch angles when the rotor hub 302 is no longer encountering angular acceleration or deceleration.

Figure 3C:
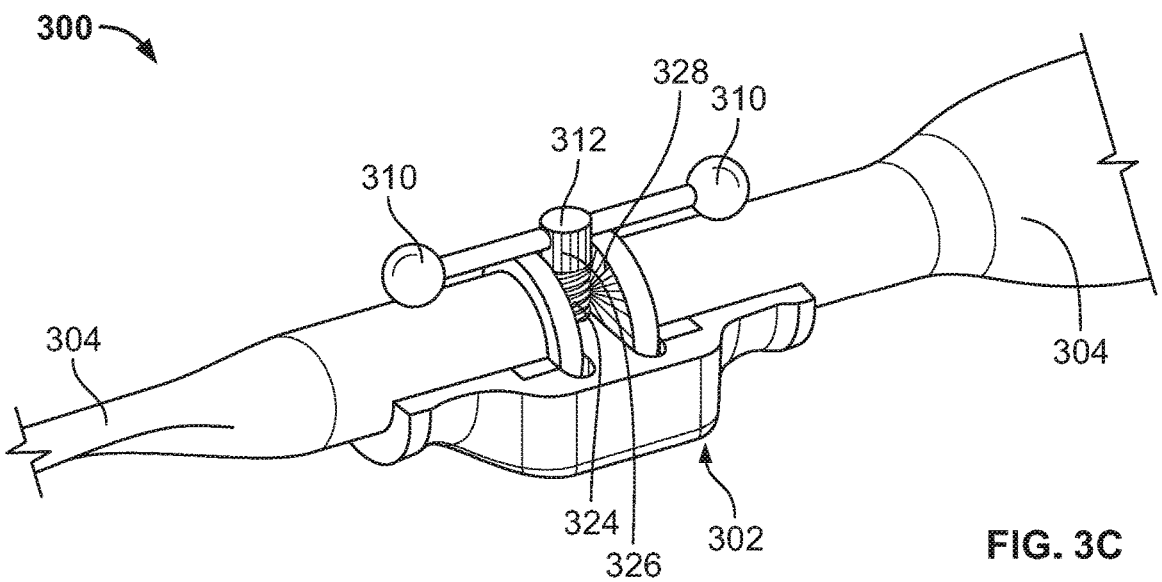

Turning to FIG. 3C, the example rotor 300 is shown, but with the masses 310 oriented differently from the example shown in FIGS. 3A and 3B. Particularly, the masses 310 generally extend from the synchronizer 312 along a longitudinal length of the rotor blades 304.

In operation, forces of the masses 310 resulting from a change in torque applied to the rotor hub 302 cause rotation of the synchronizer 312 and, thus, varies pitch angles of the rotor blades 304. In this particular example, a gear 326 of the synchronizer 312 contacts and engages gears 328 of the rotor blades 304 to rotate the rotor blades 304. In some examples, the spring 324 returns the rotor blades 304 to a nominal steady state pitch angle when the rotor hub 302 is not being accelerated or decelerated.

Figure 3D:
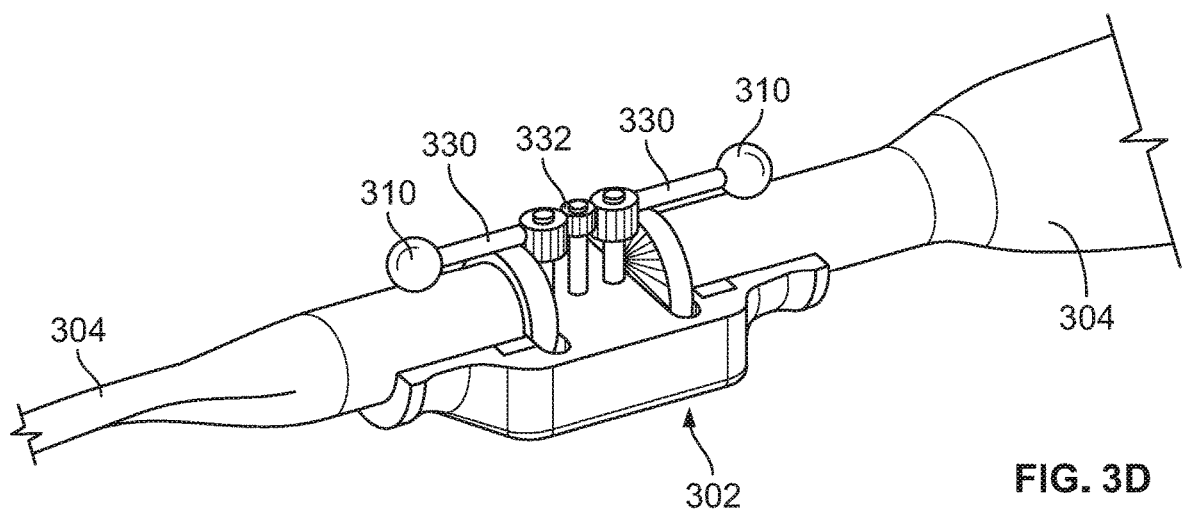

FIG. 3D depicts the example rotor 300 of FIG. 3C, but with the masses 310 on separate (e.g., independent) rotating arms 330. In some examples, a synchronizer 332 is rotationally coupled to the rotating arms 330. However, in other examples, the synchronizer 332 is not implemented. In such examples, each of the masses 310 causes movement of the respective rotor blade 304 when an acceleration is applied to the rotor hub 302.

Figure 4A:
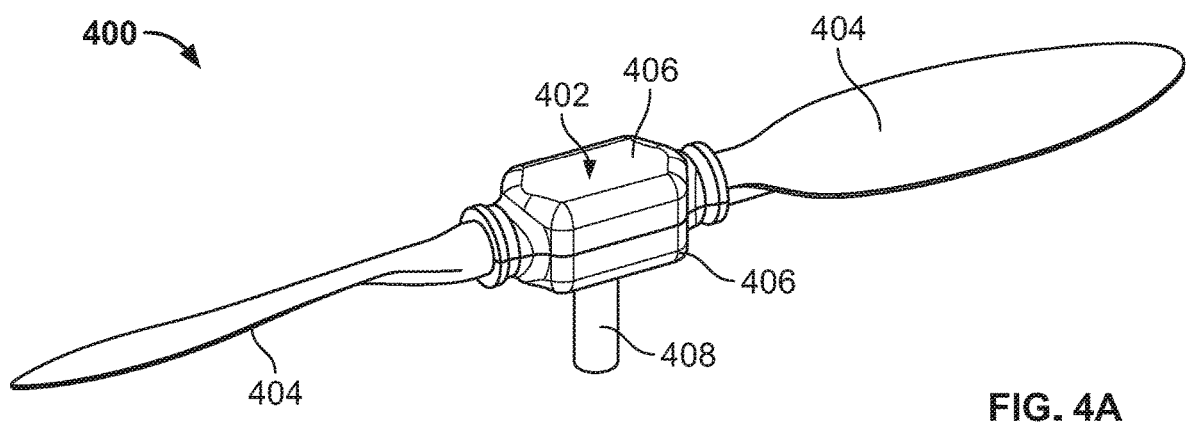
FIGS. 4A-4C illustrate another alternative example rotor in accordance with teachings of this disclosure.
Figure 4B:
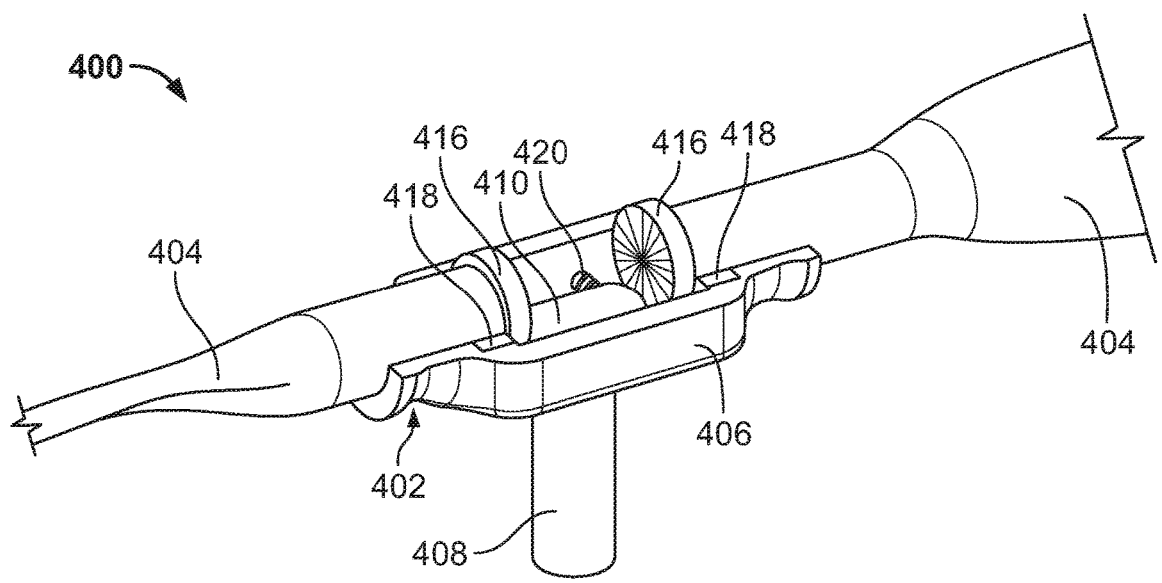
Figure 4C:
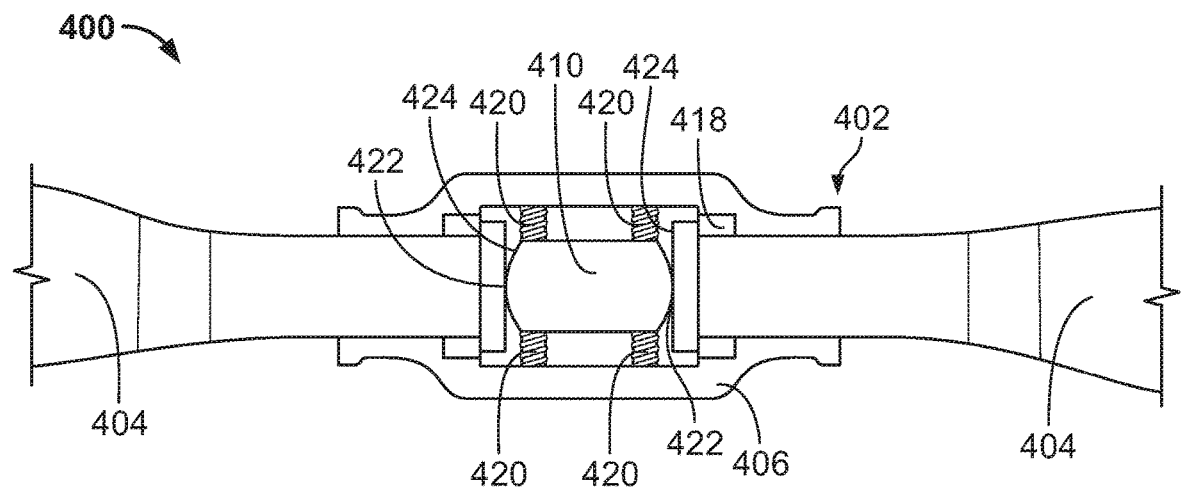

FIGS. 4A-4C illustrate yet another alternative example rotor 400 in accordance with teachings of this disclosure. Turning to FIG. 4A, the rotor 400 includes a rotor hub 402 and rotor blades 404 operatively coupled to the rotor hub 402 which, in turn, includes covers 406. The rotor 400 of the illustrated example also includes a drive shaft (e.g., a drive stem) 408, to which the rotor hub 402 is non-rigidly constrained.

Turning to FIG. 4B, the rotor 400 is shown with one of the covers 406 of the rotor hub 402 removed. In the illustrated example, a stem base (e.g., a drive shaft frame, etc.) 410 is coupled to the aforementioned drive shaft 408 and disposed within a cavity 412 of the rotor hub 402. In this example, the stem base 410 is coupled to multiple springs 420. Particularly first ends of the springs 420 are coupled to inner walls or features of the cover 406 while second ends of the springs 420 are coupled to the stem base 410. Further, the rotor blades 404 include corresponding bases 416 and are operatively coupled to bearings 418.

FIG. 4C is a top view of the rotor 400 with one of the covers 406 removed. In this example, the stem base 410 is coupled to the cover 406 via four of the springs 420 and is generally rectangular in shape. However, the stem base 410 may be any other appropriate shape and any other appropriate number of the springs 420 may be implemented. In the illustrated example, the stem base 410 can move rotationally with the drive shaft 408 shown in FIGS. 4A and 4B. Alternatively, the stem base 410 can be constrained in other degrees of freedom (e.g., directions into and along the plane of the page of FIG. 4C). In this example, the stem base 410 includes first gears 422 to interface with second gears 424 of the base 416. In other examples, a linkage and/or linkage system may be implemented instead.

To vary a pitch angle of the rotor blades 404, a change in torque of the drive shaft 408 causes a rotation of the stem base 410 relative to the cover 406. In turn, the rotation of the stem base 410 moves the first gears 422, thereby causing the second gears interface 424 and, thus, the rotor blades 404 to rotate about the corresponding bearings 418.

Figure 5A:
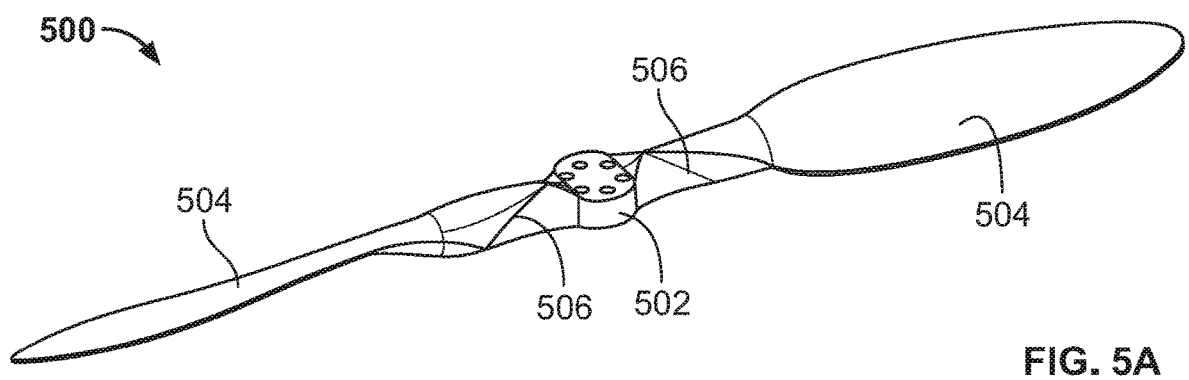
FIGS. 5A-5C illustrate yet another example rotor in accordance with teachings of this disclosure.
Figure 5B:
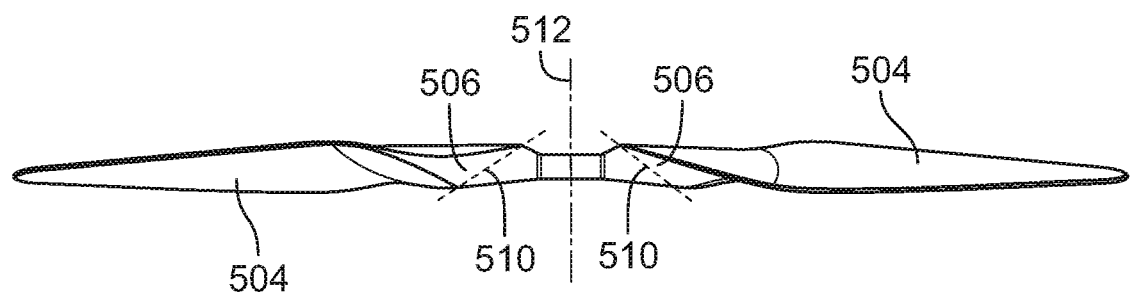
Figure 5C:
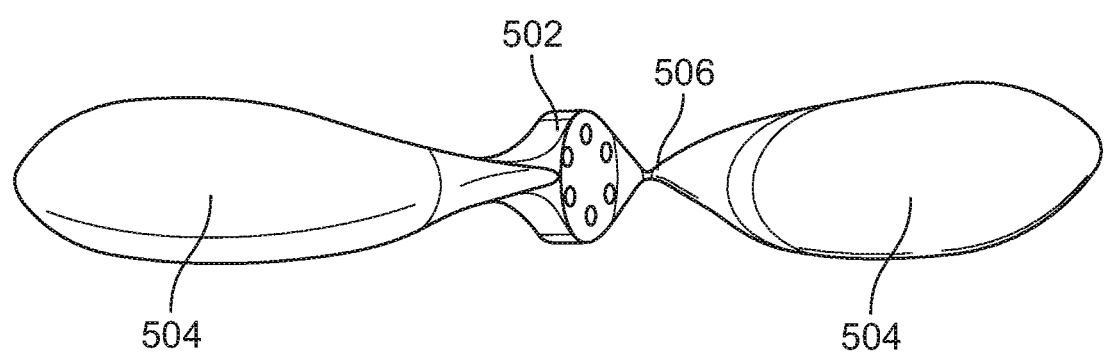

FIGS. 5A-5C illustrate an example rotor 500 in accordance with teachings of this disclosure. In the illustrated example of FIG. 5A, the example rotor 500 can be a single piece (e.g., molded, machined, cast, cured composite, etc.) or an assembly of multiple components. The example rotor 500 includes a rotor hub 502, rotor blades 504 and a hinge (e.g., a reaction hinge) 506.

Turning to FIG. 5B, a cross-sectional view of the example rotor 500 is shown. As can be seen in the example of FIG. 5B, the hinge 506 exhibits a bend region (e.g., an angled bend region, a pivoting area, a flexure plane, etc.) 510 that is angled from an axis of rotation of the rotor 500. Further, the rotor blades 504 are contoured to transition to the hinge 506. The example hinge 506 and/or the bend region 510 can be implemented as a geometric shape (e.g., a narrow region, a flexible region, etc.) or a device (e.g., a mechanical hinge, etc.) that enables bending of the rotor 500 in response to an angular acceleration.

In operation, angular acceleration causes the rotor blades 504 and/or the hinges 506 to bend, thereby changing a pitch angle of the rotor blades 504. In particular, the hinge 506 and/or the bend region 510 couples a lead-lag in-plane motion to a change in pitch angle of the rotor blades 504. As a result, the rotor 500 can have a pitch angle (e.g., a feathered pitch angle) along a single skewed hinge axis. In this example, the hinge 506 acts as a reaction hinge.

FIG. 5C depicts a perspective view of the rotor 500. As can be seen in FIG. 5C, the rotor 500 includes the aforementioned hinge 506, which exhibits curvature that gradually transitions to the rotor hub 502. In other words, contours of the rotor 500 can be blended to facilitate flexure at the hinge 506 and/or the rotor blades 504.

Figure 6:
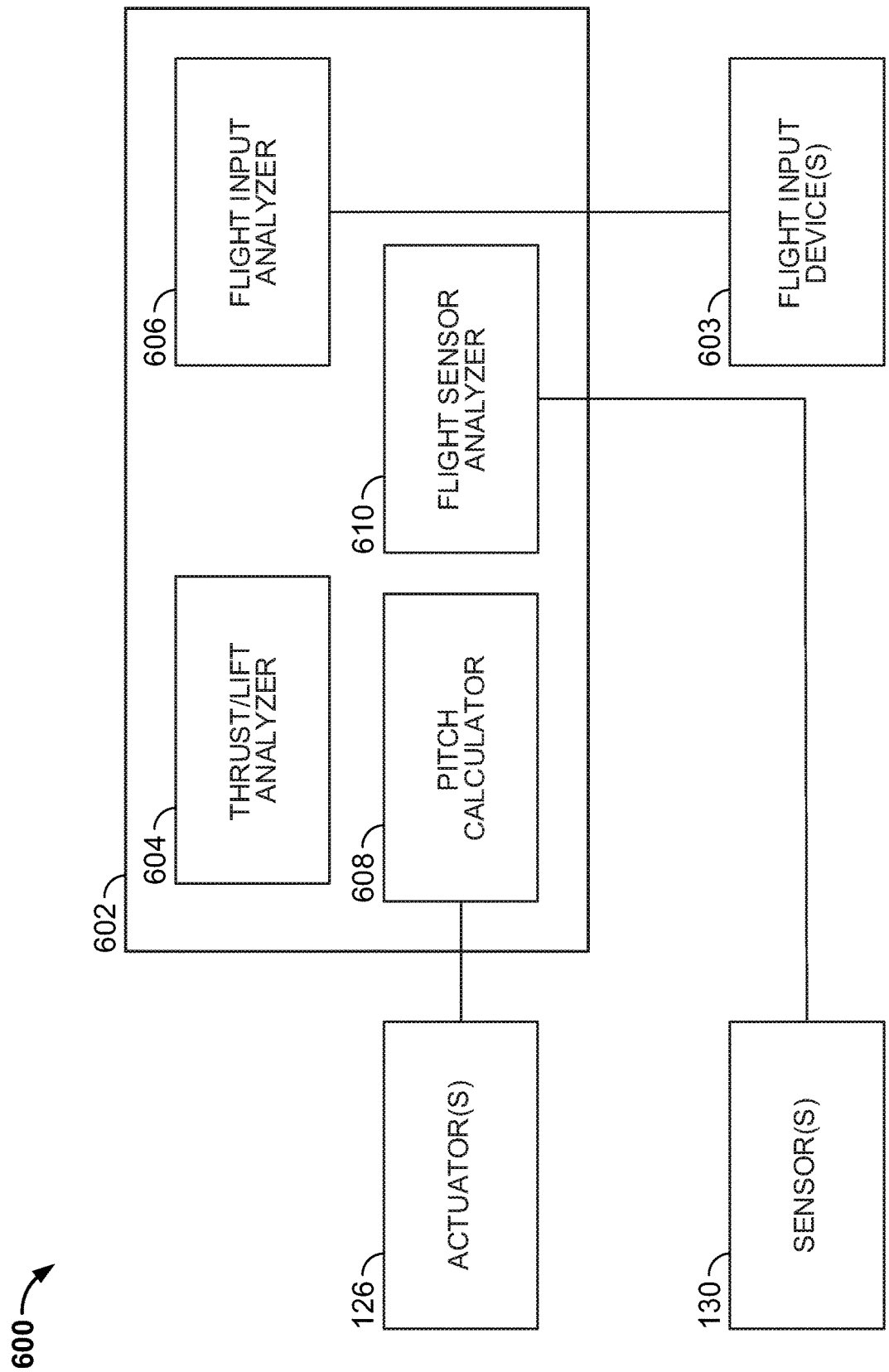
FIG. 6 illustrates an example pitch angle control system to implement examples disclosed herein.

FIG. 6 illustrates an example pitch angle control system 600 to implement examples disclosed herein. The pitch angle control system 600 of the illustrated example can be implemented in the controller(s) 128 shown in FIG. 1 and includes a pitch analyzer 602 which, in turn, is operatively coupled to actuator(s) 126, sensor(s) 130 and flight input device(s) 603. In turn, the aforementioned example pitch analyzer 602 includes a thrust/lift analyzer 604, a flight input analyzer 606, a pitch calculator 608 and a flight sensor analyzer 610.

The thrust/lift analyzer 604 of the illustrated example determines a desired thrust and/or lift of a rotor (e.g., the rotors 100, 200, 300, 400, 500) of a vehicle (e.g., an aircraft). The thrust/lift analyzer 604 can make this determination based on flight inputs received from the flight input device(s) 603 and analyzed by the flight input analyzer 606.

The example pitch calculator 608 determines a desired pitch angle and/or pitch adjustment associated with the rotors. For example, the pitch calculator 608 can calculate a desired pitch angle based on a measured acceleration and/or desired steady state pitch angle associated with rotor blades of the rotor. Additionally or alternatively, the pitch calculator 608 can determine the desired pitch angle based on sensor data from the flight sensor analyzer 610.

In the illustrated example, the flight sensor analyzer 610 analyzes sensor data from the sensor(s) 130 and provides input to the pitch calculator 608. The sensor data can pertain to acceleration, a change in acceleration (e.g., an acceleration differential) and/or a measured position/orientation of the rotor.

While an example manner of implementing the pitch angle control system 600 of FIG. 6 is illustrated in FIG. 6, one or more of the elements, processes and/or devices illustrated in FIG. 6 may be combined, divided, re-arranged, omitted, eliminated and/or implemented in any other way. Further, the example pitch analyzer 602, the example thrust/lift analyzer 604, the example flight input analyzer 606, the example pitch calculator 608 and the example flight sensor analyzer 610 and/or, more generally, the example pitch angle control system 600 of FIG. 6 may be implemented by hardware, software, firmware and/or any combination of hardware, software and/or firmware. Thus, for example, any of the example pitch analyzer 602, the example thrust/lift analyzer 604, the example flight input analyzer 606, the example pitch calculator 608 and the example flight sensor analyzer 610 and/or, more generally, the example pitch angle control system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pitch analyzer 602, the example thrust/lift analyzer 604, the example flight input analyzer 606, the example pitch calculator 608, and/or the example flight sensor analyzer 610 is/are hereby expressly defined to include a non-transitory computer readable storage device or storage disk such as a memory, a digital versatile disk (DVD), a compact disk (CD), a Blu-ray disk, etc. including the software and/or firmware. Further still, the example pitch angle control system 600 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
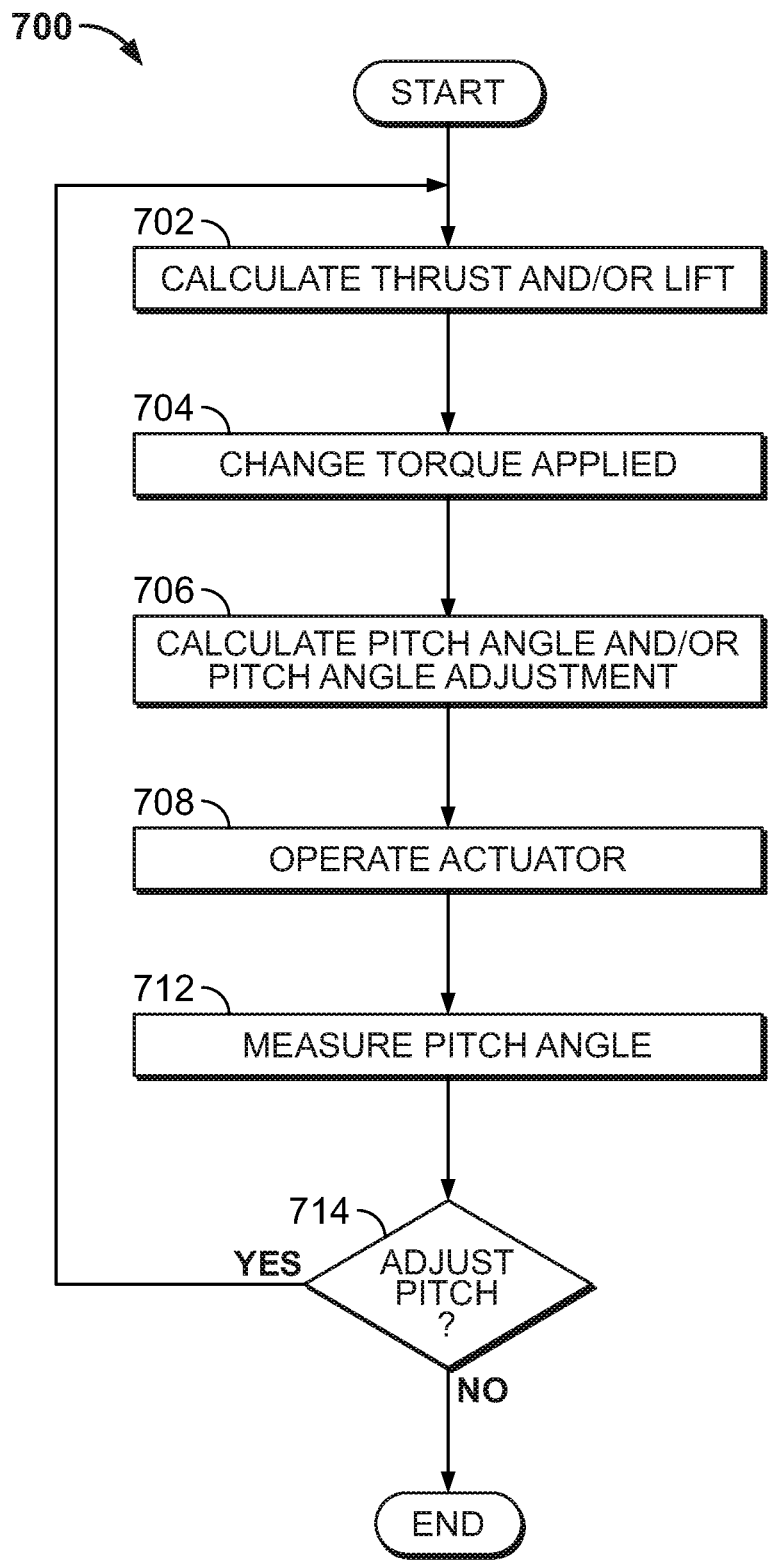
FIG. 7 is a flowchart representative of machine readable instructions which may be executed to implement examples disclosed herein.

A flowchart representative of example hardware logic, machine readable instructions, hardware implemented state machines, and/or any combination thereof for implementing the pitch angle control system 600 of FIG. 6 is shown in FIG. 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example pitch angle control system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 700 of FIG. 7 begins as a rotor (e.g., the rotor 100, the rotor 200, the rotor 300, the rotor 400, the rotor 500) is being rotated at a relatively constant torque. In particular, the rotor is being operated by spinning the corresponding rotor blades of the rotor to generate lift and/or thrust (e.g., for hovering and/or flight).

At block 702, the lift/thrust analyzer 604 calculates an amount of thrust and/or lift to be generated by the rotor and/or the rotor blades. In this example, the thrust and/or lift is calculated based on sensor data from the flight sensor analyzer 610 and/or input from the flight input device(s) 603.

At block 704, the lift/thrust analyzer 604 directs a change in torque and, thus, an angular acceleration to be applied to the rotor and/or a rotor hub operatively coupled to the rotor. The change in torque may be based on the calculated amount of thrust and/or lift. Additionally or alternatively, the change in torque is based on flight inputs received at the flight input device(s) 603.

At block 706, the pitch calculator 608 calculates a pitch angle and pitch angle adjustment of the rotor blades (e.g., an adjustment pitch angle of the rotor blades). In this example, the pitch calculator 608 calculates the pitch angle based on an amount of torque applied to a rotor hub and/or a change in torque (e.g., a torque differential) applied to the rotor hub. For example, the change in torque can be measured at the sensor(s) 130 or determined based on flight input(s).

At block 708, the pitch calculator 608 directs movement of and/or operates the actuator(s) 126 to adjust the pitch angles of the rotor blades. In some examples, multiple ones of the actuator(s) are coordinated to adjust the pitch angles.

At block 712, the sensor(s) 130 measure at least one pitch angle of the rotor blades. Additionally or alternatively, the sensor(s) 130 measure an angular acceleration or an amount of torque applied to the rotor or a rotor hub operatively coupled to the rotor.

At block 714, it is determined by the example pitch calculator 608 and/or the thrust lift analyzer 604 whether to adjust the pitch angle. This determination may be based on whether the pitch angles are skewed significantly. If the pitch angle is to be adjusted (block 714), control of the process returns to block 702. Otherwise, the process ends.

Figure 8:
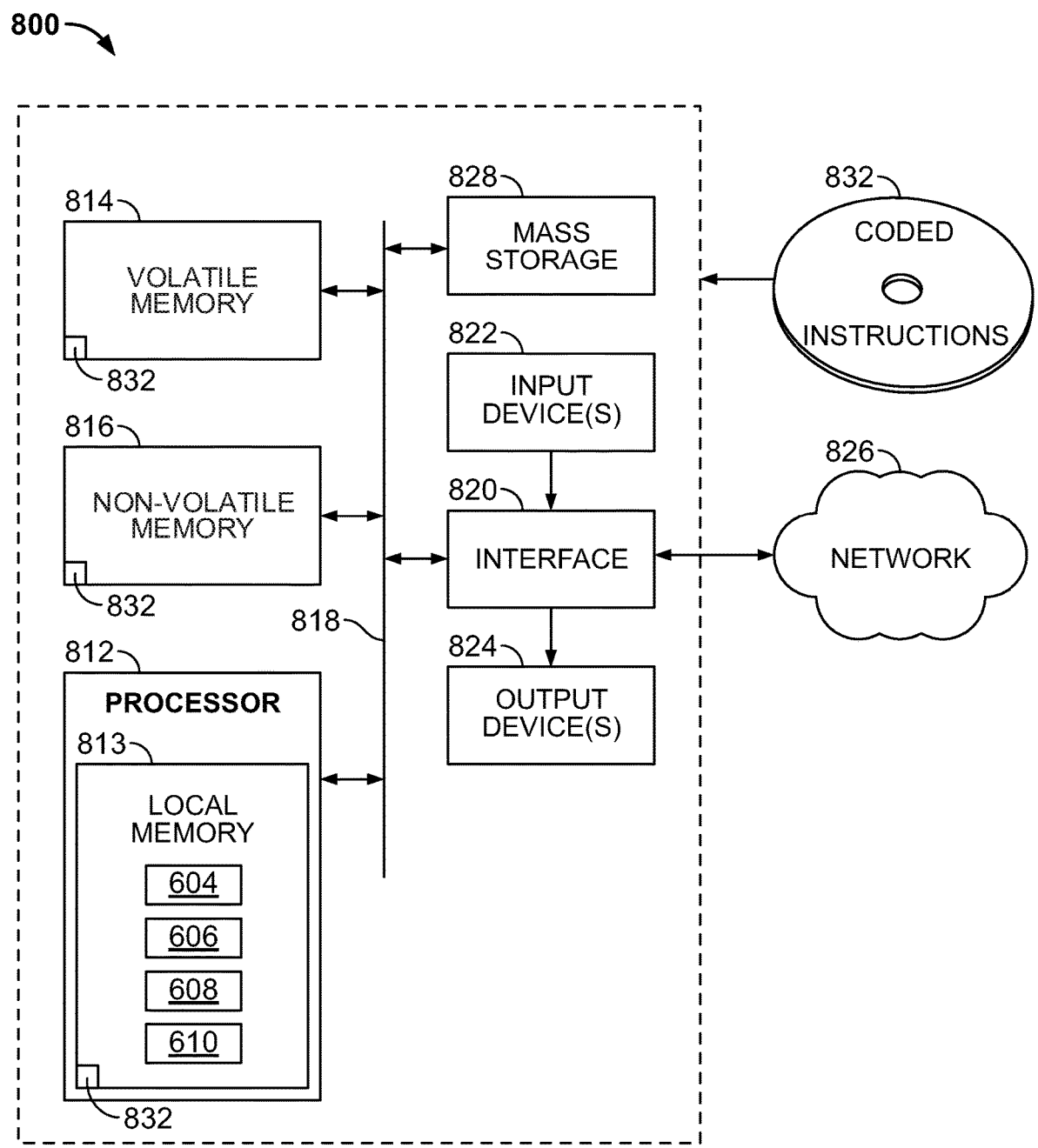
FIG. 8 is a block diagram of an example processing platform structured to execute the instructions of FIG. 7 to implement examples disclosed herein.

FIG. 8 is a block diagram of an example processor platform 800 structured to execute the instructions of FIG. 7 to implement the pitch angle control system 600 of FIG. 6. The processor platform 800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements pitch analyzer 602, the example thrust/lift analyzer 604, the example flight input analyzer 606, and the example pitch calculator 608.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

Example 1 includes a rotor having a rotor hub to rotate about a rotational axis, rotor blades coupled to the rotor hub, the rotor blades being pitch adjustable and having corresponding pitch angles, and a reaction hinge operatively coupled between the rotor hub and the rotor blades, the reaction hinge to move relative to the rotor hub in response to an angular acceleration or deceleration of the rotor hub to adjust the pitch angles.

Example 2 includes the rotor as defined in example 1, further including a movable mass to be displaced relative to the rotor hub by the reaction hinge.

Example 3 includes the rotor as defined in example 1, where the reaction hinge includes an actuator to move at least one of the rotor blades in response to the change in torque.

Example 4 includes the rotor as defined in example 3, further including a sensor to measure an orientation of at least one of the rotor blades, wherein the actuator moves the at least one of the rotor blades based on the orientation.

Example 5 includes the rotor as defined in example 3, further including a sensor to measure the angular acceleration or deceleration of the rotor hub, wherein the actuator moves the at least one of the rotor blades based on the angular acceleration or deceleration.

Example 6 includes the rotor as defined in example 1, further including a synchronizer operatively coupled between the rotor blades.

Example 7 includes the rotor as defined in example 1, where the reaction hinge includes a displaceable mass that moves relative to the rotor hub in response to the angular acceleration or deceleration.

Example 8 includes the rotor as defined in example 1, where the reaction hinge is at least partially disposed within a cavity of the rotor hub, the reaction hinge to move within the cavity.

Example 9 includes the rotor as defined in example 1, where the reaction hinge includes first gears to move respective second gears of the rotor blades when the reaction hinge moves in response to the acceleration or the deceleration.

Example 10 includes a method of operating a rotor. The method includes changing an amount of torque applied to a rotor hub operatively coupled to rotor blades, the rotor hub to spin about a rotational axis, a reaction hinge operatively coupled between the rotor blades and the rotor hub, and in response to an angular deceleration or acceleration of the rotor hub from the change in the amount of torque, moving the reaction hinge relative to the rotor hub to adjust pitch angles of the rotor blades.

Example 11 includes the method as defined in example 10, further including measuring, via a sensor, an orientation of at least one of the rotor blade, calculating, via instructions executed by at least one processor, an adjustment of the pitch angle of at least one of the rotor blades based on the measured orientation, and causing an actuator of the reaction hinge to change the pitch angle of the at least one of the rotor blades based on the calculated adjustment.

Example 12 includes the method as defined in example 10, further including determining, via instructions executed by at least one processor, a desired thrust or lift of the rotor, and causing an actuator of the reaction hinge to change the pitch angle of the at least one of the rotor blades based on the determined desired thrust or lift.

Example 13 includes the method as defined in example 10, where the pitch angle is adjusted by moving a displaceable mass relative to the rotor hub, the displaceable mass operatively coupled to the reaction hinge.

Example 14 includes the method as defined in example 10, where the pitch angle is adjusted by moving first gears of the reaction hinge to cause movement of second gears of the rotor blades.

Example 15 includes the method as defined in example 10, where moving the reaction hinge relative to the rotor hub includes moving the reaction hinge within a cavity of the rotor hub.

Example 16 includes the method as defined in example 15, wherein moving the reaction hinge relative to the rotor hub includes rotating the reaction hinge within the cavity via springs operatively coupled between a stem base and the rotor hub.

Example 17 includes a non-transitory machine readable medium includes instructions, which when executed, cause a processor to at least calculate a desired adjustment of a pitch angle of at least one rotor blade based on an angular acceleration or deceleration of a rotor hub operatively coupled to the at least one rotor blade, and cause movement of a reaction hinge relative to the rotor hub, the reaction hinge operatively coupled between the at least one rotor blade and the rotor hub based on the desired adjustment.

Example 18 includes the non-transitory machine readable medium as defined in example 17, where the instructions cause the processor to calculate a desired amount of thrust or lift of the at least one rotor blade, and wherein the desired adjustment of the pitch angle is calculated based on the desired amount of thrust or lift.

Example 19 includes the non-transitory machine readable medium as defined in example 17, where the instructions cause the processor to cause the movement of the reaction hinge via an actuator.

Example 20 includes the non-transitory machine readable medium as defined in example 17, where the instructions cause the processor to cause the movement of the hinge by moving a displaceable mass operatively coupled to the at least one pitch adjustable rotor.

From the foregoing, it will be appreciated that example methods, apparatus and articles of manufacture have been disclosed that enable relatively quick rotor pitch adjustment. Accordingly, examples disclosed herein enable low latency rotor pitch adjustment. Examples disclosed enable energy-efficient movement of rotor blades. Examples disclosed herein can also provide weight and cost reductions.

This patent claims priority to, and the benefit of, U.S. Provisional Patent Application Ser. No. 62/818,832, which was filed on Mar. 15, 2019. U.S. Provisional Patent Application Ser. No. 62/818,832 is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A rotor comprising:
a rotor hub to rotate about a rotational axis;
at least one actuator;
rotor blades having respective longitudinal axes, the rotor blades including respective tabs positioned in the rotor hub and at a same longitudinal position of the longitudinal axes, the tabs operatively coupled to the at least one actuator, the rotor blades being pitch adjustable and having corresponding pitch angles based on displacement of the tabs; and
a sensor communicatively coupled to the at least one actuator, the sensor to detect an angular acceleration or deceleration of the rotor hub, wherein the at least one actuator is configured to adjust the pitch angles based on the detected angular acceleration or deceleration of the rotor hub.

2. The rotor as defined in claim 1, wherein the at least one actuator is to move at least one of the rotor blades in response to a change in torque.

3. The rotor as defined in claim 1, further including an additional sensor to measure an orientation of at least one of the rotor blades, wherein the actuator moves the at least one of the rotor blades based on the orientation.

4. The rotor as defined in claim 1, wherein the actuator is at least partially disposed within a cavity of the rotor hub.

5. The rotor as defined in claim 1, wherein the actuator is directed by a controller to adjust the pitch angles based on the detected angular acceleration or deceleration of the rotor hub.

6. The rotor as defined in claim 1, wherein the tabs are arranged as pairs on opposing radial sides of the respective longitudinal axes of the rotor blades.

7. The rotor as defined in claim 1, further including lift analyzer circuitry to:
calculate an amount of lift to be generated by the rotor; and
based on the calculated amount of lift, determine an angular acceleration to be applied to the rotor.

8. The rotor as defined in claim 1, further including thrust analyzer circuitry to:
calculate an amount of thrust to be generated by the rotor; and
based on the thrust calculation, determine an angular acceleration to the be applied to the rotor, wherein the at least one actuator is to adjust the pitch angles further based on the determined acceleration.

9. The rotor as defined in claim 1, wherein the at least one actuator is configured to adjust the pitch angles to counteract a fluttering motion of the rotor blades.

10. The rotor as defined in claim 1, wherein the rotor includes a cover panel to be removably couplable to the rotor hub for access to an internal volume of the rotor hub.

11. The rotor as defined in claim 1, further including a second actuator, wherein the at least one actuator and the second actuator are coordinated to adjust the pitch angles.

12. The rotor as defined in claim 1, wherein the at least one actuator is a piezo-electric actuator.

13. The rotor as defined in claim 1, wherein the at least one actuator is a linear actuator.

14. The rotor as defined in claim 1, wherein the at least one actuator is configured to adjust the pitch angles to non-acceleration steady state pitch angles.

15. The rotor as defined in claim 1, wherein the at least one actuator is a solenoid.

16. A method of operating a rotor, the method comprising:
changing an amount of torque applied to a rotor hub operatively coupled to rotor blades, the rotor blades having respective longitudinal axes, the rotor blades including respective tabs positioned in the rotor hub and at a same longitudinal position of the longitudinal axes, the tabs operatively coupled to at least one actuator, the rotor blades being pitch adjustable and having corresponding pitch angles based on displacement of the tabs, the rotor hub to spin about a rotational axis; and
adjusting, with the at least one actuator, the pitch angles of the rotor blades based on signals from a sensor, the sensor to detect an angular acceleration or deceleration of the rotor hub from the change in the amount of torque.

17. The method as defined in claim 16, further including:
measuring, via a sensor, an orientation of at least one of the rotor blades; and
causing the actuator to change the pitch angle of the at least one of the rotor blades based on the measured orientation.

18. The method as defined in claim 16, further including:
determining, via instructions executed by at least one processor, a desired thrust or lift of the rotor; and
causing the actuator to change the pitch angle of the at least one of the rotor blades based on the determined desired thrust or lift.

19. The method as defined in claim 16, wherein moving the actuator relative to the rotor hub includes moving the actuator within a cavity of the rotor hub.

20. A non-transitory machine readable medium comprising instructions, which when executed, cause a processor to at least:
determine, based on output from a sensor, an angular acceleration or deceleration of a rotor hub coupled to rotor blades, the rotor blades having a respective longitudinal axis, the rotor blades including respective tabs positioned in the rotor hub and at a same longitudinal position of the longitudinal axis, the tabs operatively coupled to at least one actuator, the rotor blades being pitch adjustable and having at least one corresponding pitch angle based on displacement of the tabs; and
cause the at least one actuator to adjust the at least one pitch angle based on the determined angular acceleration or deceleration of the rotor hub.

* * * * *